United States Patent [19]
Hasebe

[11] 3,863,084
[45] Jan. 28, 1975

[54] SYNCHRONOUS MOTOR

[75] Inventor: Sukehiro Hasebe, Sukagawa, Japan

[73] Assignee: Copal Company Limited, Tokyo-To, Japan

[22] Filed: Nov. 29, 1973

[21] Appl. No.: 420,087

[30] Foreign Application Priority Data
Nov. 30, 1972 Japan............................ 47-119411

[52] U.S. Cl.................. 310/126, 310/114, 310/156, 310/162, 310/41
[51] Int. Cl. ......................................... H02k 21/08
[58] Field of Search .................. 310/41, 162–164, 310/112, 114, 126, 156, 191, 209, 190

[56] References Cited
UNITED STATES PATENTS
| | | | |
|---|---|---|---|
| 1,612,330 | 12/1926 | Trumpler...................... | 310/112 X |
| 2,782,328 | 2/1957 | Lindberg....................... | 310/126 X |
| 2,805,375 | 9/1957 | Morgan......................... | 310/112 X |
| 3,173,042 | 3/1965 | Fodor............................ | 310/114 X |
| 3,713,015 | 1/1973 | Frister.......................... | 310/119 X |

*Primary Examiner*—Donovan F. Duggan
*Attorney, Agent, or Firm*—Cushman, Darby & Cushman

[57] ABSTRACT

A self-starting type synchronous motor comprising a pair of permanent-magnet rotors rotatable in directions opposite to each other by means of magnetic coupling, and a magnetic pole arranged adjacent to at least one of said rotors and capable of making said rotors rest at positions shifted from such positions where the magnetic coupling is strongest, for the purpose of achieving reliable self-starting.

2 Claims, 2 Drawing Figures

SYNCHRONOUS MOTOR

BACKGROUND OF THE INVENTION

1. Field of the Invention

The present invention relates to a synchronous motor and, more particularly, a self-starting type synchronous motor for which self-starting can be carried out without fail.

2. Description of the Prior Art

A small-sized synchronous motor capable of self-starting, when a field coil of coreless type is energized, having a rotor of permanent magnet at a position shifted from the inherent rest position (on the center line of the magnetic field) is known for example by Japanese Patent Publication No. 876/1968. This kind of known synchronous motor, however, has a disadvantage that self-starting cannot be effected reliably because only one permanent magnet is used as a rotor and that permanent magnet rotor is rested at a position shifted from the inherent rest position by means of a magnetic pole.

SUMMARY OF THE INVENTION

It is, therefore, the principal object of the present invention to provide a synchronous motor having permanent-magnet rotors for which self-starting is carried out reliably.

The object of the present invention will be achieved by arranging a pair of permanent-magnet rotors, which are rotatable in directions opposite to each other by means of magnetic coupling, at positions adjacent to each other so that said pair of rotors perform synchronous rotation by a field coil or field coils, and at the same time, by arranging a magnetic pole piece at a position near at least one of said rotors so that said two rotors will rest at positions shifted from their inherent rest positions (on the center line of the magnetic field).

According to the present invention, said magnetic pole piece is movable.

DESCRIPTION OF THE PREFERRED EMBODIMENT

Figure 1:
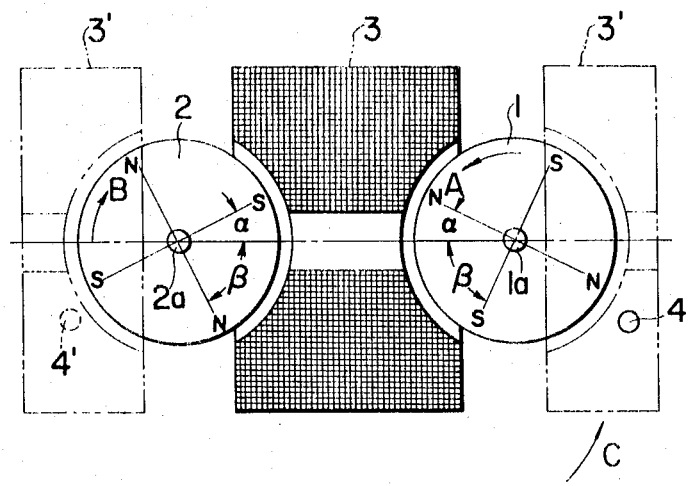
FIG. 1 shows a construction drawing of the main part of an embodiment of the synchronous motor according to the present invention.

In FIG. 1, numerals 1 and 2 designate permanent-magnet rotors respectively having four magnetic poles and are arranged in parallel with and adjacent to each other. Said rotors are arranged so that, for example, the rotor 1 drives a load through a gear train which is not illustrated and the rotor 2 is kept in no-load condition or drives another load which is different from the load driven by the rotor 1. In other words, rotors 1 and 2 are not to drive the same load. Numeral 3 designates a coreless coil arranged between permanent-magnet rotors 1 and 2 so that the axis of the coil, i.e., the center line of the magnetic field comes on the line which connects shafts 1a and 2a of rotors 1 and 2. Numeral 4 designates a magnetic pole piece arranged near the permanent-magnet rotor 1 which serves to displace the magnetic pole of said rotor 1 to a position shifted by a pre-determined angle from the center line of the magnetic field of the coreless coil 3. That is, the magnetic pole piece 4 serves to rest permanent-magnet rotors 1 and 2 at positions shifted from their inherent rest positions as shown in FIG. 2 by a pre-determined angle.

Operation of this embodiment of the synchronous motor according to the present invention is as described below.

Figure 2:
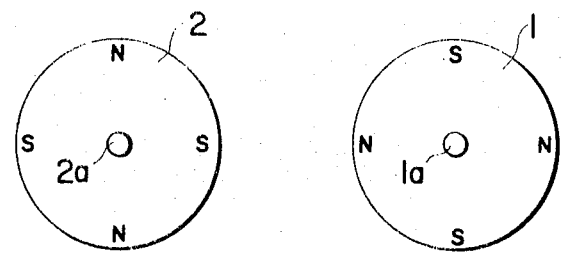
FIG. 2 shows an explanatory drawing illustrating the inherent rest positions of two permanent-magnet rotors.

If the magnetic pole piece 4 does not exist, permanent-magnet rotors 1 and 2 will rest, in the non-operating condition when the coreless coil 3 is not energized, at positions where poles of different magnetic polarities are facing each other as shown in FIG. 2, i.e., in such condition that the magnetic coupling is strongest. Even if the coil 3 is energized under the above condition, self-starting of the motor cannot be achieved.

When a magnetic pole piece is provided at a position near the rotor 1 as in the case of the present invention, rotors 1 and 2 rest in such condition that the attractive force, for example, between the N pole of the rotor 1 and S pole of the rotor 2 is balanced with the attractive force between the N pole on the opposite side of the rotor 1 and magnetic pole piece 4. At that time, the N pole of the rotor 1 and S pole of the rotor 2 are displaced to positions shifted by the angle $\alpha°$ from the center line of the magnetic field to be generated by the coil 3. As the coil 3 for making a magnetic field does not contain any magnetic substance, the relative position of rotors 1 and 2 in the rest condition is determined only by the magnetic pole piece 4.

When the coil 3 is energized in the above condition and a magnetic field is generated in the direction to attract rotors 1 and 2, said rotors 1 and 2 are respectively turned in directions shown by arrowheads A and B because of combined effect caused by the displacement of magnetic poles of rotors 1 and 2 from the center line of the magnetic field of the coil 3 and by the force to achieve the strongest magnetic coupling between said rotors. As an alternating current flows to the coil 3 and alternating magnetic field is generated, rotors 1 and 2 receive combined effect of rotation caused by turning torque by attracting and repelling actions and synchronous rotation by magnetic coupling, thus keep on their rotation.

When the shifting angle of the S pole of the rotor 1 and N pole of the rotor 2 from the center line of the magnetic field of the coil 3 is designated as $\beta°$, the directivity in starting is improved when the difference between $\alpha$ and $\beta$ increases, while the starting torque becomes large when the difference between $\alpha$ and $\beta$ decreases, though there may be a limit. Therefore, by adequately selecting the relation between $\alpha$ and $\beta$, it is possible to set said relation to reliably start the motor in the predetermined direction with a suitable starting torque. For this purpose, the magnetic pole piece 4 can be moved concentrically with the rotor 1 and arranged so that, when once set to the most favourable position, it will not come out of the position unless it is so desired.

Besides, the fact that two rotors rotate in directions opposite to each other by magnetic coupling under the steady-state running condition after starting provides another advantage as described below.

That is, if an impact in the direction shown by the arrowhead C (rotating direction of the rotor 1) is given to the motor body, the rotating speed of the rotor 1 increases instantaneously and, on the contrary, rotating speed of the rotor 2 decreases instantaneously. If said impact is given when the relative position of both rotors is as shown in FIG. 1, said impact acts on the rotor 1 as a force to make it return in the direction opposite to the arrowhead A, and acts on the rotor 2 as a force to advance it in the direction shown by the arrowhead B. That is, the N pole of the rotor 1 tends to go apart from the S pole of the rotor 2. However, as these magnetic poles has the tendency to come to the condition that their magnetic coupling is strongest, these rotors maintain the condition as illustrated and, as a result, step-out by said impact is offset. Consequently, rotors 1 and 2 continue their rotation without stopping. The above-mentioned effect is obtained in the same way also when vibration is given to the motor in the tangential direction of either rotor.

Though the coreless coil 3 is arranged between rotors 1 and 2 in the above-mentioned embodiment, it is also possible to arrange the field coil so that it will face only one of those rotors as designated by numeral 3' in FIG. 1 or to arrange a plural number of coils so that they will separately face the respective rotors.

Besides, in the above embodiment, the magnetic pole piece 4 is arranged near the rotor 1 only. It is, however, also possible to arrange the magnetic pole piece near the rotor 2 as designated by numeral 4' in FIG. 1 or to arrange magnetic pole pieces near both rotors respectively.

As described in the above, the synchronous motor according to the present invention has two permanent-magnet rotors having the same number of magnetic poles and arranged in parallel so that their magnetic poles of different polarities will be coupled on their opposed surfaces by means of their magnetic coupling, at least one coreless coil which faces at least one of said two permanent-magnet rotors, and at least one magnetic pole piece arranged near at least one of said permanent-magnet rotors in order to displace magnetic poles of said permanent-magnet rotors to positions shifted by a pre-determined angle from the center line of the magnetic field generated by the coreless coil. Therefore, at the time of starting, self-starting can be achieved quite easily and reliably by combined effect of the displacement of magnetic poles of said permanent-magnet rotors from the center line of the magnetic field of the coreless coil and the force caused by tendency of said rotors to come to the condition under which the magnetic coupling is strongest between said rotors.

Furthermore, as rotating directions of said two rotors are opposite to each other, step-out of synchronous rotation is offset and does not appear even when the motor body is subjected to an impact or vibration, thus the motor keeps on running without stopping.

I claim:

1. A synchronous motor comprising a permanent-magnet rotor having a plural number of magnetic poles, a second permanent-magnet rotor having the same number of magnetic poles as said first permanent-magnet rotor and arranged adjacent to said first permanent-magnet rotor so that said second permanent-magnet rotor rotates in a direction opposite to said first permanent-magnet rotor and being magnetically coupled with said first permanent-magnet rotor, at least one coreless field coil arranged to embrace a part of at least one of said first and second permanent-magnet rotors, and a magnetic pole piece arranged adjacent to at least one of said first and second permanent-magnet rotors in order to rest said first and second permanent-magnet rotors at positions shifted by a predetermined rotation angle other than 45° from their inherent rest positions.

2. A synchronous motor according to the claim 1, in which said magnetic pole piece is movable.

* * * * *